US006173572B1

(12) United States Patent
Cobo et al.

(10) Patent No.: US 6,173,572 B1
(45) Date of Patent: Jan. 16, 2001

(54) METHOD AND APPARATUS FOR CONTROLLING A BYPASS VALVE OF A FLUID CIRCUIT

(75) Inventors: Michael A. Cobo, Saint Charles; Douglas W. Koehler, Peoria, both of IL (US)

(73) Assignee: Caterpillar Inc., Peoria, IL (US)

( * ) Notice: Under 35 U.S.C. 154(b), the term of this patent shall be extended for 0 days.

(21) Appl. No.: 09/404,013

(22) Filed: Sep. 23, 1999

(51) Int. Cl.[7] ...................................................... F16D 31/02
(52) U.S. Cl. ................................. 60/327; 60/445; 60/468
(58) Field of Search .............................. 60/327, 445, 468

(56) References Cited

U.S. PATENT DOCUMENTS 4,938,022 7/1990 Hirata et al. ........................... 60/426
4,945,723 8/1990 Izumi et al. ........................... 60/426
5,267,440 12/1993 Nakamura et al. .................... 60/426
5,361,211 11/1994 Lee et al. ........................ 364/424.07
5,394,697 * 3/1995 Hirata ..................................... 60/468
5,499,503 3/1996 Stoychoff ............................... 60/469
5,540,049 7/1996 Lunzman ............................... 60/327
5,609,088 3/1997 Park ...................................... 91/420
5,680,760 * 10/1997 Lunzman ............................... 60/468

* cited by examiner

*Primary Examiner*—F. Daniel Lopez
(74) *Attorney, Agent, or Firm*—W. Bryan McPherson

(57) ABSTRACT

The present invention provides a method and apparatus for controlling the fluid flow in a fluid circuit 102. The fluid circuit 102 includes a pump 32 driven by an engine 106. The pump 32 delivers fluid to at least one actuator 44, 45 through a control valve assembly 120, 122. In addition, the pump is connected to a bypass control valve, which is connected to a fluid tank. The method includes the steps of establishing a desired fluid flow to be delivered by the pump, determining an expected fluid flow to be delivered by the pump in response to the desired fluid flow, and determining a position of the bypass control valve in response to the expected fluid flow.

17 Claims, 3 Drawing Sheets

Controller
Pump
Engine
22
104
16
18
19
20
28
30
32
44
45
46
48
12
106
120
122
124
126
130
132

METHOD AND APPARATUS FOR CONTROLLING A BYPASS VALVE OF A FLUID CIRCUIT

TECHNICAL FIELD

This invention relates generally to a fluid circuit, and more particularly, to a method and apparatus for controlling the fluid flow in a fluid circuit.

BACKGROUND ART

Some hydraulic systems include a positive flow control system by combining an electronically actuated valve, e.g., a closed center control valve, with an electronically actuated displacement control pump. A positive flow control system may maximize efficiency while eliminating the mechanical complexity associated with traditional load sensing systems. In one embodiment, a positive flow control system provides improved system response, in part, by providing control commands to the pump and valves that are proportional to the operators inputs. Improved system response may be provided if the desired pressure may be quickly provided to the system, via the pump and the valves, when it is requested. However, unless the movement of the valves is accurately timed to the pump displacement, pressure spikes in the system will result. For example, if the valves close before the pump destrokes, then the remaining pump flow has nowhere to go but over the relief valve, which has several undesirable effects including increasing the pump motor work load.

Some approaches to this problem have attempted to add time delays to the pump or valve commands to insure, for example, that the control valves open before the pump is stroked up while the implement was accelerating, and the pump destroked before the valves where closed while the implement was decelerating. The nonlinear nature of the time delays makes the approach of adding time delays an ineffective solution.

The present invention is directed to overcoming one or more of the problems identified above.

DISCLOSURE OF THE INVENTION

In one embodiment of the present invention, an apparatus adapted to control the fluid flow in a fluid circuit is disclosed. The apparatus comprises a variable displacement pump adapted to receive a pump displacement command, and responsively deliver an actual fluid flow to the fluid circuit, a control valve connected to the pump, the control valve adapted to receive a control valve command signal and responsively control a position of said control valve, a bypass control valve connected between the pump and a tank, the bypass control valve adapted to receive a bypass valve command signal and responsively control a position of the bypass valve, and a controller adapted to establish a desired fluid flow, determine an expected fluid flow from the pump, and compare the desired fluid flow and the expected fluid flow.

In yet another embodiment, a method for controlling the fluid flow in a fluid circuit is disclosed. The fluid circuit includes a pump, a control valve connected to the pump, and a bypass control valve connected between the pump and a tank. The method includes the steps of establishing a desired fluid flow to be delivered by the pump, determining an expected fluid flow to be delivered by the pump in response to the desired fluid flow, and comparing the expected fluid flow and the desired fluid flow.

BEST MODE FOR CARRYING OUT THE INVENTION

Figure 1:
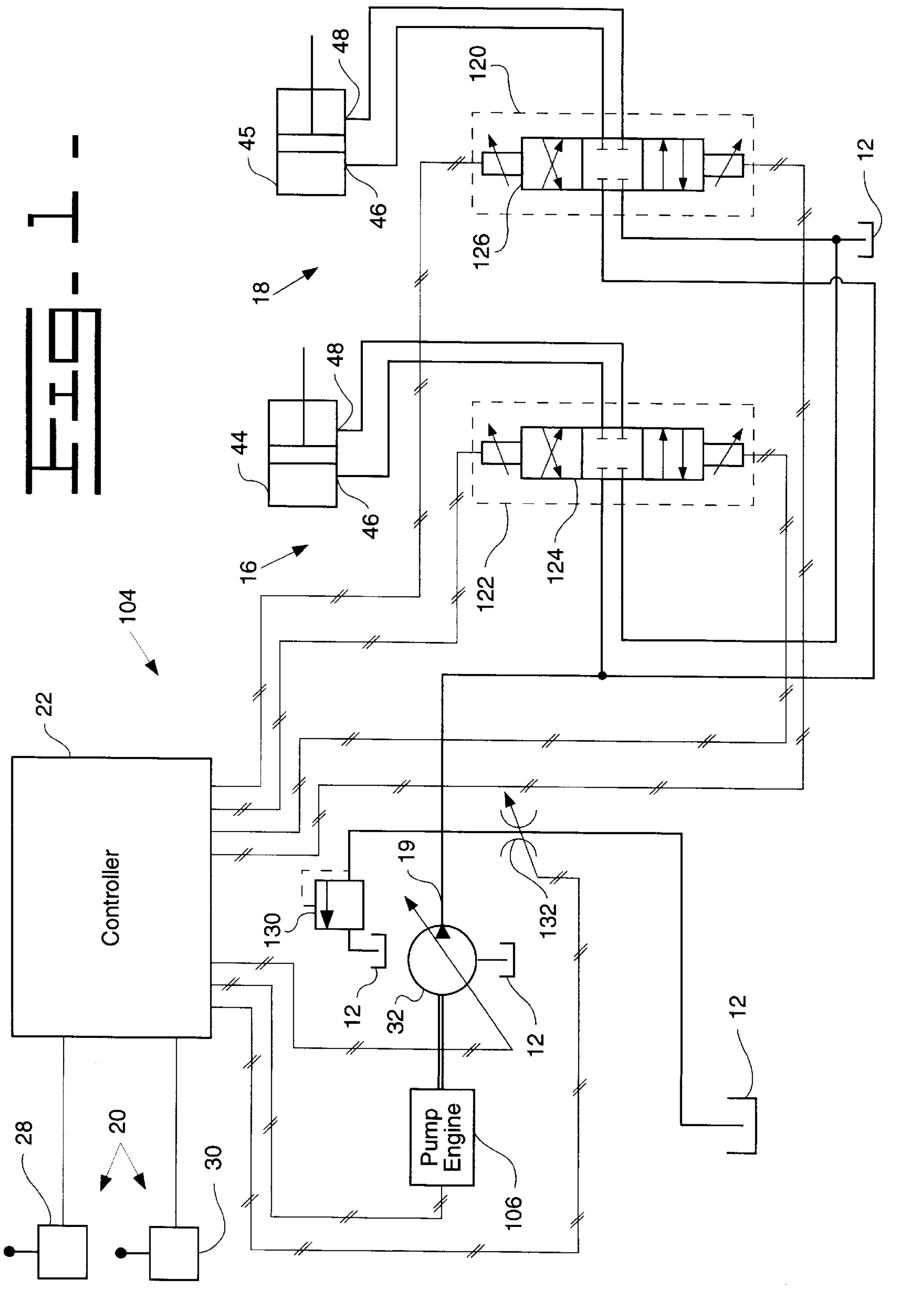
FIG. 1 is a high level diagram of one embodiment of a fluid circuit.

The present invention provides an apparatus and a method for controlling the fluid flow in a fluid circuit. FIG. 1 is an illustration of one embodiment of a fluid circuit 102. In the preferred embodiment, the fluid circuit 102 is a hydraulic circuit. The fluid circuit 102 includes a reservoir, or tank 12, a source of pressurized fluid 32, and a pump engine 106 connected to the fluid source 32. In the preferred embodiment, the source of pressurized fluid 32 of the subject embodiment may be a variable displacement pump 32. The circuit 102 may include a first and second actuator circuit 16,18 connected to the pump 32 by a fluid conduit 19, an input controller 20, and an electrical controller 22, such as a microprocessor, connected to the input controller 20.

The input controller 20, if used, may include at least one control lever mechanism. FIG. 1 illustrates a first and second control lever mechanisms 28,30, e.g., joysticks, that are each connected to the electrical controller 22 and operative to output an electrical signal to the electrical controller 22 proportional to an input from an operator. Alternatively, the machine may be autonomously controlled by a software program that generates the appropriate control commands, including the valve and pump commands. The software program may execute on the controller 22.

In one embodiment, each of the first and second actuator circuits 16,18 are the same and each includes an actuator 44,45 having first and second fluid ports 46,48. Therefore, the description with respect to the first actuator circuit 16 will also describe the second actuator circuit 18. In one embodiment, the first actuator circuit 16 also includes a valve assembly, or control valve 122. In the preferred embodiment, the valve assembly 122, 120 includes an closed centered valve 124, 126. However, other types of valves may be used in the valve assembly 120, 122.

The circuit 102 includes a relief valve 130. When the fluid pressure exceeds a pressure threshold, the fluid pressure causes the relief valve 130 to open, enabling the fluid to flow to the tank 12, thereby controlling the maximum pressure of the fluid.

The circuit 102 also includes a bypass control valve 132. The bypass valve 132 is connected between the pump 32 and the tank 12, and is responsive to commands received from the controller 22.

In one embodiment, the controller 22 receives inputs from the joysticks 28, 30, and responsively controls the motion of the actuators 44, 45 by generating the appropriate commands, including commands to the control valves 120, 122, bypass control valve 132, and pump 32.

While FIG. 1 illustrates one embodiment of a fluid circuit 102, other embodiments of the fluid circuit, including, valve assemblies, and relief pressure systems may be used without deviating from the essence of the present invention.

Figure 2:
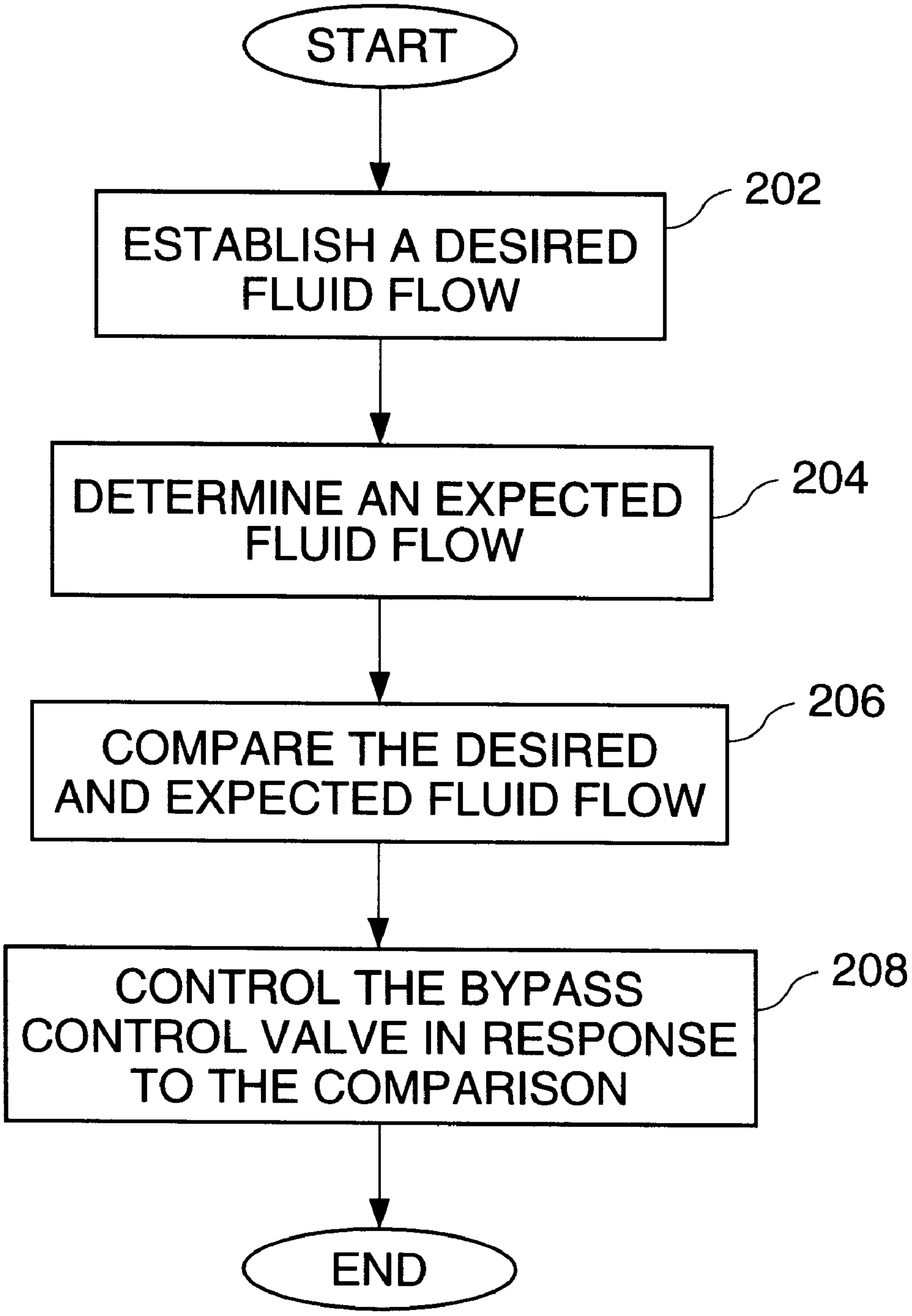
FIG. 2 illustrates one embodiment of a method of controlling the fluid flow in a fluid circuit 102.

FIG. 2 illustrates one embodiment of a method of controlling the fluid flow in a fluid circuit 102. The method includes the steps of establishing a desired fluid flow to be delivered by the pump 32, determining an expected fluid flow to be delivered by the pump in response to the desired fluid flow, comparing the expected fluid flow and the desired fluid flow, and determining a position of the bypass control valve 132 in response to the comparison of the expected and desired fluid flow.

In a first control block 202 a desired fluid flow to be delivered by the pump 32 is established. In one embodiment, the flow request for each of the actuator circuits 16, 18 is added together resulting in a total desired fluid flow requested from the pump 32. The flow request may be determined in response to the input control signals received from the first and second control lever mechanisms 28,30, which are controlled by the operator. The input control signals are indicative of the desired motion of the actuators 44, 45. Determining the desired fluid flow delivered by the pump, or total fluid flow request, in response to the input control signals is well known in the art and will not be further elaborated on here. Alternatively, the machine may operate in an autonomous mode in which case the desired fluid flow may be established by a software program responsible for the autonomous control of the machine and the associated fluid circuit 102.

In one embodiment, the desired fluid flow is compared with a maximum fluid flow. The maximum fluid flow is indicative of the maximum fluid displacement of the pump 32. If the desired fluid flow is greater than the maximum fluid flow then the desired fluid flow is limited to the maximum fluid flow.

In a second control block 204 an expected fluid flow is determined. In one embodiment, the expected fluid flow may be determined by utilizing a pump dynamic model. The desired fluid flow may be input into the pump dynamic model. The pump dynamic model is, preferably, a software routine which simulates the output of the pump 32. That is, the pump dynamic model generates an expected fluid flow value of the pump in response to the desired fluid flow. The pump dynamic model may be generated through empirical analysis.

Figure 3:
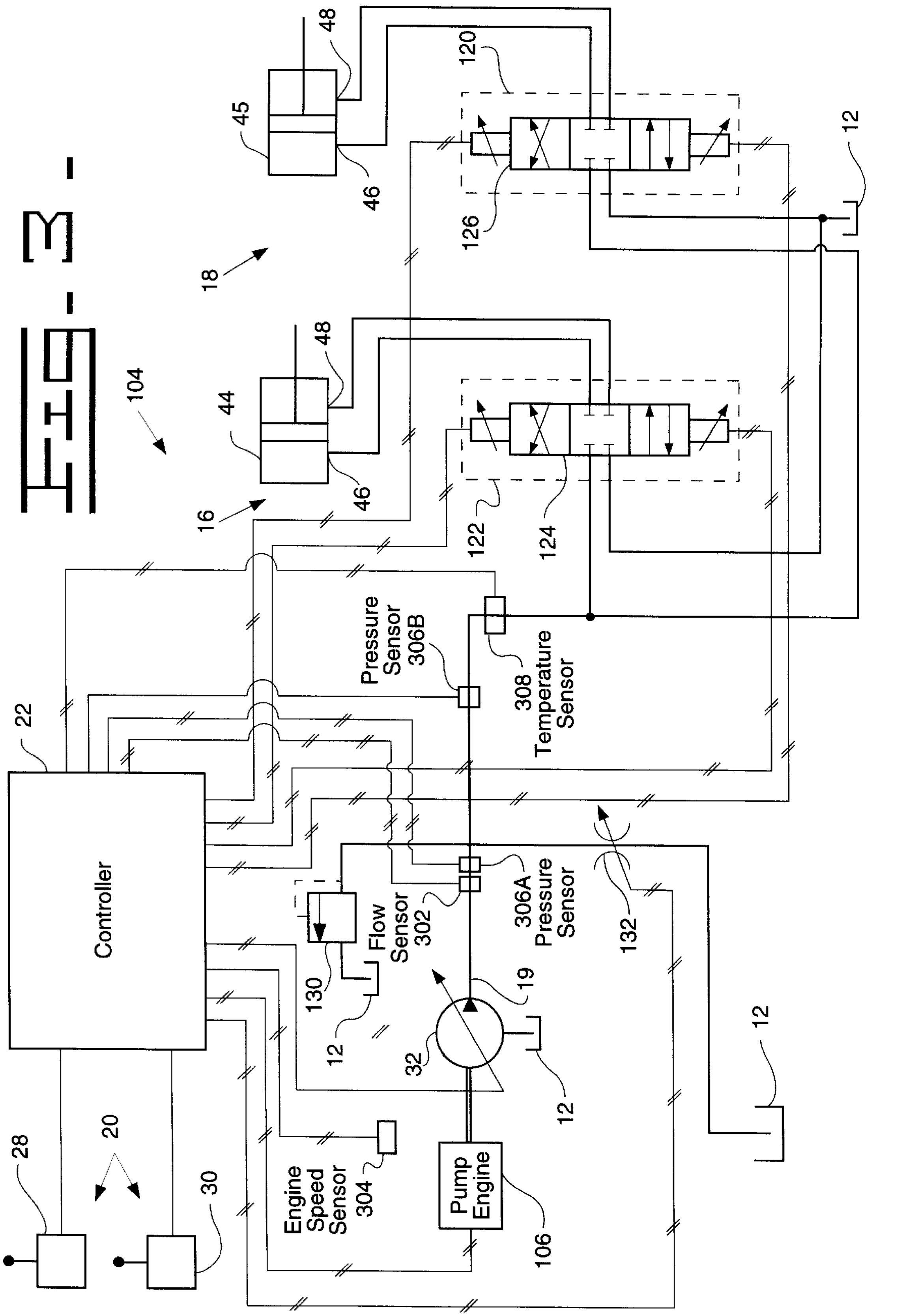
FIG. 3 is an alternative embodiment of the high level diagram of the fluid circuit.

In one embodiment, the pump dynamic model may be a second order, or higher, transfer function which represents the input-output dynamic characteristics of the pump, e.g., input command current vs. pump displacement. Alternatively, the pump dynamic model may be further scheduled as a function of pump input speed, pump discharge pressure, and pump displacement. In yet another alternative, the pump may have fixed dynamic models. The specific type of model used is pump and implementation dependent. Therefore, the pump dynamic model may receive one or more additional inputs, via the controller 22, from the circuit 102, as illustrated in FIG. 3, such as: a current pump displacement, which may be sensed by a flow sensor 302, a current pump engine speed, which may be sensed by engine speed sensor 304, the current fluid pressure, which may be sensed by pressure sensor 306, the current fluid temperature, which may be sensed by temperature sensor 308, the current position of the control valves 124, 125 and bypass valve 132, and the current actuator loads. The pump dynamic model then determines the expected fluid displacement in response to the inputs provided. For example, for a desired fluid flow, and given the current operating conditions of the circuit, the model will predict the displacement of the pump, i.e., the expected fluid flow.

In the preferred embodiment, an expected fluid flow is based on the pump flow needed to account for the desired fluid flow. In one embodiment, when there is no desired fluid flow to control the actuators 44, 45, the pump 32 still generates a minimum fluid flow in order to prevent the pump 32 from overheating. Therefore, the bypass control valve 132 is commanded to a position enabling the minimum flow to return to the tank 12 when there is no desired fluid flow. As the desired fluid flow is modified to control the actuators 44, 46, the expected fluid flow generated by the pump dynamic model changes accordingly.

In a third control block 206, the expected fluid flow determined by the model is compared to the desired fluid flow. In the preferred embodiment, a transient flow error is generated in response to the comparison between the expected and the desired fluid flow. The transient flow error may represent the expected difference between the desired fluid flow and the fluid flow that the pump will generate, i.e., the expected fluid flow. The transient flow error is then added to the minimum pump flow to determine an expected excess fluid flow that needs to pass through the bypass control valve 32 in order to obtain the desired response from the actuators 44, 45. That is, the fluid flow generated by the pump 32 up to the desired fluid flow, is passed through the control valves 125, 125 to control the actuators 44, 45. The excess fluid flow, i.e., the transient flow error and the minimum pump flow, pass through the bypass control valve 132 and return to the tank 12.

In a fourth control block 208, the bypass control valve 208 is then controlled in response to the comparison of the expected and desired fluid flow. In the preferred embodiment, the transient flow error is added to the minimum pump flow, resulting in a fluid flow value that is to pass through the bypass control valve 132. The controller 22 will generate the appropriate bypass control valve 132 commands in response to the resultant fluid flow to achieve the desired actuator 44, 45 response.

Alternatively, the pump displacement model also accounts for the minimum pump flow needed to prevent the pump from overheating when there is no fluid flow request. Therefore, the desired fluid flow is input into the pump dynamic model, resulting in an expected fluid flow. The expected fluid flow already accounts for the minimum fluid flow, therefore, the desired fluid flow is compared to the expected fluid flow resulting in a transient flow error, that is used to generate the bypass valve commands, without having to add a minimum flow value.

INDUSTRIAL APPLICABILITY

The present invention provides a method and apparatus for controlling the fluid flow in a fluid circuit 102. The fluid circuit 102 includes a pump 32 driven by an engine 106. The pump 32 delivers fluid to at least one actuator 44, 45 through a control valve assembly 120, 122. In addition, the pump is connected to a bypass control valve, which is connected to a fluid tank. The method includes the steps of establishing a desired fluid flow to be delivered by the pump, determining an expected fluid flow to be delivered by the pump in response to the desired fluid flow, comparing the expected and desired fluid flow, and determining a position of the bypass control valve in response to the comparison.

In one embodiment, no fluid flow is requested, i.e., the desired fluid flow is zero, and the pump delivers a minimum fluid flow to prevent the pump from overheating. The bypass control valve is controlled to enable the fluid flow to go to tank. As the user, either an operator or an autonomous program, operates the actuators, the desired fluid flow is delivered to a pump dynamic model to simulate the output of the pump, i.e., determine an expected fluid flow. The expected fluid flow is compared to the desired fluid flow to determine a transient flow error. The transient flow error is then combined with the minimum pump flow and the resulting fluid flow value is used to determine the appropriate bypass control valve position in order to maintain the appropriate fluid pressure to achieve the desired actuator response. The transient flow error is indicative of the position the bypass control valve should be placed in order to prevent pressure spikes and pressure lagging situations as the actuator movements are being accelerated and decelerated.

Other aspects, objects, and advantages of the present invention can be obtained from a study of the drawings, the disclosure, and the claims.

What is claimed is:

1. An apparatus adapted to control the fluid flow in a fluid circuit, comprising:

- a variable displacement pump adapted to receive a pump displacement command, and responsively deliver an actual fluid flow to the fluid circuit;
- a fluid actuator;
- a control valve connected between said pump and said actuator, said control valve adapted to receive a control valve command signal and responsively control a position of said control valve;
- a bypass control valve connected between said pump and a tank, said bypass control valve adapted to receive a bypass valve command signal and responsively control a position of said bypass valve; and
- a controller adapted to establish a desired fluid flow, determine an expected fluid flow from said pump in response to said desired fluid flow, compare said desired fluid flow and said expected fluid flow, generate a bypass control valve command signal in response to said comparison, and generate said pump displacement command signal and said control valve command signal in response to said desired fluid flow.

2. An apparatus, as set forth in claim 1, wherein said controller is further adapted to establish said desired fluid flow in response to one of an operator input, and a desired actuator movement.

3. An apparatus, as set forth in claim 1, including a flow sensor adapted to determine a fluid flow delivered by said pump and responsively generate a flow signal; wherein said controller is further adapted to receive said flow signal and determine said expected fluid flow in response to said desired fluid flow and said flow signal.

4. An apparatus, as set forth in claim 1, including a pressure sensor adapted to determine a fluid pressure and responsively generate a pressure signal, said sensor being located between said pump and said control valve; wherein said controller is further adapted to receive said pressure signal and determine said expected fluid flow in response to said desired fluid flow and said pressure signal.

5. An apparatus, as set forth in claim 1, including a speed sensor adapted to determine a speed of said pump and responsively generate a speed signal; wherein said controller is further adapted to receive said speed signal and determine said expected fluid flow in response to said desired fluid flow and said speed signal.

6. An apparatus, as set forth in claim 1, including a load sensor adapted to determine a load of said actuator and responsively generate a load signal; wherein said controller is further adapted to receive said load signal and determine said expected fluid flow in response to said desired fluid flow and said load signal.

7. An apparatus, as set forth in claim 1, including a pressure sensor adapted to determine a fluid pressure and responsively generate a pressure signal, said sensor being located between said control valve and said actuator; wherein said controller is further adapted to receive said pressure signal and determine said expected fluid flow in response to said desired fluid flow and said pressure signal.

8. An apparatus, as set forth in claim 1, wherein said controller further includes a pump dynamic model adapted to receive said desired fluid flow and responsively generate said expected fluid flow.

9. An apparatus, as set forth in claim 8, wherein said controller is further adapted to determine an error in response to said comparison, and generate said bypass control valve command signal in response to said error.

10. An apparatus, as set forth in claim 9, wherein said controller is further adapted to establish a minimum pump fluid flow, and determine said bypass control valve command signal in response to said error and said minimum pump fluid flow.

11. A method for controlling the fluid flow in a fluid circuit, the fluid circuit including a pump, an actuator, a control valve connected between the pump and the actuator, and a bypass control valve connected between the pump and a tank, comprising the steps of:

- establishing a desired fluid flow to be delivered by the pump;
- determining an expected fluid flow to be delivered by the pump in response to said desired fluid flow;
- comparing said expected fluid flow and said desired fluid flow; and
- determining a position of said bypass control valve in response to said comparison of said expected and said desired fluid flow.

12. A method, as set forth in claim 11, wherein the step of establishing said expected fluid flow includes the step of establishing said expected fluid flow in response to said desired fluid flow and at least one of a current pump displacement, a current pump speed, a current fluid pressure.

13. A method, as set forth in claim 11, wherein the step of establishing said expected fluid flow includes the step of establishing said expected flow in response to said desired fluid flow and at least one of a current control valve position, a current actuator load, and a current pump displacement command.

14. A method, as set forth in claim 11, including the step of determining an error in response to said comparison of said expected fluid flow and said desired fluid flow, and; wherein the step of determining said position of said bypass control valve further includes the step of determining said position in response to said flow error.

15. A method, as set forth in claim 14, wherein the step of determining said expected fluid flow further includes the step of delivering said desired fluid flow to a pump dynamic model, said pump dynamic model generating an expected fluid flow in response to said desired fluid flow.

16. A method, as set forth in claim 15, including the step of establishing a minimum pump fluid flow, wherein the step of determining said bypass control valve signal includes the step of determining said bypass control valve signal in response to said error and said minimum pump fluid flow.

17. A method, as set forth in claim 16, including the steps of:

- comparing said desired fluid flow to a maximum fluid flow, and
- limiting said desired fluid flow to said maximum fluid flow when said desired fluid flow is greater than said maximum fluid flow.

* * * * *